3,072,631
POLYMERIZATION OF α-OLEFINS WITH THREE COMPONENT SOLUBLE CATALYSTS IN LIQUID PHASE
Frederick B. Joyner, Kingsport, Tenn., assignor to Eastman Kodak Company, Rochester, N.Y., a corporation of New Jersey
No Drawing. Filed Nov. 29, 1955, Ser. No. 549,844
20 Claims. (Cl. 260—94.9)

This invention relates to a new and improved polymerization process and is particularly concerned with the use of novel catalysts for preparing high molecular weight solid poly-α-olefins of high density and crystallinity. More specifically, the invention is concerned with improved processes for polymerizing olefins such as ethylene, propylene, or mixtures thereof, to give polymers having densities much higher than those achieved by high pressure polymerization processes, without the necessity of employing the extremely high temperature and pressure conditions necessary heretofore.

The commercial polyethylene prepared by high pressure polymerization techniques, although useful for a variety of applications, has a relatively low softening temperature and is too flexible for many uses. This high pressure polyethylene is characterized by a relatively high degree of chain branching and a density which is considerably lower than the theoretical density. Usually, pressures in excess of 500 atmospheres and commonly of the order of 1000–1500 atmospheres are employed to effect the polymerization to solid polymer. Such pressures have been necessary even with the use of oxygenated catalysts such as the peroxides.

For many years, olefins have been polymerized to give low molecular weight liquid polymers. Some success has attended scattered efforts to form solid polymers at low pressures and temperatures using various catalytic materials, but the results thereby obtained by use of catalytic materials have been almost completely unpredictable. Thus, a minor change in the nature of the catalytic material often has meant the difference between obtaining a low molecular weight liquid polymer and a high molecular weight solid polymer. Furthermore, some of the catalysts which would result in formation of solid polymer, did so only at extremely high pressures and hence offered little advantage over the usual high pressure polymerization processes wherein flexible low density polymers were obtained.

This invention is concerned with and has for an object to provide improved processes whereby α-monoolefins are readily polymerized by catalytic means to give high molecular weight solid polymers of improved softening temperature, density, crystallinity and stiffness. A particular object of the invention is to provide an improved process for preparing a wide variety of poly-α-olefins at pressures ranging from atmospheric pressure up to relatively high pressures and at temperates ranging from —60° C. to about 130° C. Another object of the invention is to provide an improved method for making polyethylene, polypropylene, or ethylene-propylene copolymers having such improved characteristics.

These and other objects which will be apparent from the description and claims which follow are attained by means of the process embodying the present invention wherein α-monoolefins, either singly or in admixture, are readily polymerized to high molecular weight solid polymers by effecting the polymerization in the presence of a catalytic mixture of (1) a halide of aluminum, zinc or magnesium, (2) lead tetraalkyl or tin tetraalkyl wherein each alkyl group contains 1–12 carbon atoms, and (3) titanium tetrachloride, titanium tetrabromide or a titanium tetraalkoxide wherein each alkoxide group contains 1–4 carbon atoms. The specific nature of the invention is illustrated by the fact that all three of the catalyst components are necessary in order to obtain the desired solid polymer. When only two of the components are employed, the solid polymer cannot be obtained in the desired yields or over the wide range of conditions which is possible when employing the catalytic mixture embodying this invention. Thus, the three component catalyst mixtures of this invention gave excellent results at very low temperatures and pressures as well as at high temperatures and pressures. It is thus apparent that the polymerization of ethylene and similar α-olefins to form the solid high density polymers depends upon rather specific catalyst combinations, and the reason why some compounds work and others do not is not readily understood. It has been found, however, that the substitution of closely related compounds in the catalyst mixture renders the mixture almost completely useless for the purpose herein defined. The metal halide employed is desirably aluminum chloride or aluminum bromide, although the zinc or magnesium chlorides or bromides can be used with somewhat less advantageous results. Any of the lead or tin tetraalkyls can be used wherein the alkyl groups contain 1–12 carbon atoms, although the lower alkyls are preferred for convenience and economy. The inventive process is carried out in liquid phase in an inert organic liquid and preferably an inert liquid hydrocarbon vehicle. The process proceeds with excellent results over a temperature range from as low as —60° to as high as 130° C. Ordinarily, temperatures within the range of —20° C. to 80° C. are preferred for optimum results. The pressure can be varied as desired with pressures as low as atmospheric pressure being completely operable and pressures of 100 p.s.i. or higher being desirably employed in some cases, pressures of as much as 20,000 p.s.i. or higher being desirably used in some instances. For most commercial operations, pressures of 50–700 p.s.i. are preferred and give optimum yields of desirable polymer. The liquid vehicle employed is desirably one which serves both as a liquid medium and a solvent for the solid polymerization products at the temperature of polymerization.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixtures include such materials as n-butylene, isobutylene, 1-pentene, 1-decene, and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The various components of the catalyst system are individually well known, and their preparation is not described herein. The aluminum, zinc and magnesium halides have been used for many years in Friedel-Crafts reactions but are ineffective for formation of solid product. The addition of a titanium halide or alkoxide to such metal halides does not activate the catalyst system, and the lead or tin alkyls are useless as individual catalysts or when used in combination with the titanium compound or the aluminum, zinc or magnesium halide individually. In practicing the invention, the titanium compound is desirably either titanium tetrachloride or titanium tetrabromide. The titanium alkoxides give active catalyst systems but are less preferably employed.

The only limitation on the temperature at which the process can be effected is the decomposition temperature of the catalyst. The pressure employed is usually only sufficient to maintain the reaction mixture in liquid form during the polymerization. The catalyst mixtures employed are readily soluble in the organic liquid vehicles commonly employed and hence the uniformity of reaction can be readily controlled. The exact nature of the catalytic action between those components of the catalytic mixture is not understood. The extreme activity of the mixture is shown by the fact that the polymerization can be carried out at temperatures as low as −60° C. and atmospheric pressure as well as at higher temperatures and pressures. The polymerization is desirably effected at temperatures of from −20° C. to 130° C. and usually at temperatures ranging from room temperature to 80° C. or as high as at 130° C. The combination of catalysts results in polymerization to give substantial formation of polymer in periods of from a few minutes to a few hours. It is evident that the metallic portions of the catalyst are not the sole determinant of activity since the nature of the components cannot be changed from those defined herein with any assurance of retaining any useful degree of catalytic activity. Ordinarily the catalysts herein defined are either liquid at ordinary temperatures or readily soluble in the common organic liquid vehicles and hence can be readily admixed with the polymerization medium to give a homogeneous system. No particular activation procedures or methods of preparation are necessary in order to obtain the highly active catalyst mixtures.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from −60° C. to 130° C. can be employed as desired, the usual process adapted for commercial production is carried out at a temperature in the range of from −20° C. to 80° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 50 to 700 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 4% by weight in the vehicle. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. Higher concentrations of monomer ordinarily increase the rate of polymerization. Concentrations above 5–10% by weight are ordinarily less desirable because the polymer dissolved in the reaction medium results in a very viscous solution. Since the catalyst employed is soluble in the reaction medium, the deposit of polymer on the catalyst such as occurs in the use of catalysts, is not a factor, and it is therefore not necessary to limit the conditions so that no polymer precipitates during the process.

The molar ratio of the various catalyst components can be varied rather widely and ordinarily the ratio of the components is in the range of from 1:4 to 4:1. Excellent results are obtained with approximately equimolar proportions of the catalyst components although the titanium compound can be used in molar amounts of as little as 1:32 based on the lead or tin compound. The polymerization time can be varied as desired and will usually be of the order of from 30 minutes to several hours in batch processes, with periods of from 1 to 4 hours commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkyl such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The metal halide can be any of the aluminum trihalides or zinc or magnesium dihalides if desired with aluminum chloride or aluminum bromide being preferred. If desired, however, zinc chloride, zinc bromide, magnesium chloride or magnesium bromide can be employed. The lead or tin tetraalkyl is desirably one in which the alkyl groups are the same, although the alkyl groups can be different. The preferred lead or tin compounds are the lower tetraalkyls wherein each alkyl group contains 1–4 carbon atoms such as tetramethyl lead, tetramethyl tin, tetraethyl lead, tetraethyl tin, tetrabutyl lead, tetrabutyl tin, or the like; although the higher alkyls such as the tetrahexyl, tetraoctyl or tetradodecyl compounds can be readily employed with good results. The titanium alkoxides are usually somewhat less preferable than the titanium tetrachloride or tetrabromide. When an alkoxide is used, however, the titanium tetrabutoxide is desirably employed, although such other alkoxides as defined herein and including titanium tetramethoxide, titanium tetraethoxide, or titanium tetrapropoxide can be used.

The invention is illustrated by the following examples of certain preferred embodiments thereof, although it will be understood that the invention is not limited thereby unless otherwise specifically indicated.

*Example 1*

A pressure reactor was flushed with dry nitrogen and then charged with 100 parts by weight of dry heptane, 1 part by weight of tetraethyl lead, 1 part by weight of titanium tetrachloride and 3 parts by weight of aluminum chloride. The mixture was attached to an ethylene source and agitated for a period of 4 hours at room temperature under 30 p.s.i. ethylene pressure. The solid polymer produced thereby was precipitated from the polymerization mixture by the addition of ethyl alcohol. The precipitated solid was filtered and washed four times with ethyl alcohol and dried in circulating air. The yield of polyethylene thus obtained was 7 parts by weight having an inherent viscosity of 1.50, which corresponds to a molecular weight of approximately 53,000. The polymer had a softening point above 130° C., a density of about 0.95, an average crystallinity of about 90%, a tensile strength in excess of 3000 p.s.i. and was considerably more rigid than the corresponding polyethylene obtained by the usual high pressure polymerization processes. The polymer molded readily and formed transparent sheets and films in thin section. Fibers extruded from the molten polymer showed excellent strength characteristics.

*Example 2*

A polymerization mixture of 100 parts by weight of heptane, 1 part by weight of tetraethyl lead, 1 part by weight of titanium tetrabromide, and 1 part by weight of aluminum trichloride under an ethylene pressure of 30 p.s.i. was shaken at room temperature for 2 hours. Thereafter, the temperature was raised gradually over a half hour period to 90° C. and held there for an additional 2 hours. The yield of high molecular weight polyethylene corresponding to that obtained in the preceding example was 10 parts by weight.

*Example 3*

Polyethylene was prepared in solid form and in good yield by agitating a mixture of 1% by weight of tetraethyl lead, 1% by weight of aluminum trichloride and 2% by weight of titanium tetrabutoxide in heptane under an ethylene pressure of 30 p.s.i. The mixture was polymerized in 3 hours, including 2 hours at 90° C.

*Example 4*

The procedure of Example 1 was followed using 1 part by weight of aluminum bromide instead of the aluminum chloride described in such example. A good yield of high molecular weight solid polyethylene was obtained after effecting the polymerization under 30 p.s.i. ethylene pressure at room temperature for 6 hours.

*Example 5*

Particularly good results are obtained by a continuous process wherein the concentration of components in the polymerization zone is maintained substantially constant. Thus, solutions of the various catalyst components set out in Example 1 were concurrently pumped into a tubular reactor at such rates that equimolar concentrations of the 3 catalyst components were being added. A fourth stream containing approximately a 4% solution of ethylene in heptane was also pumped into the tubular reactor. The reactor was maintained at a temperature of 40° C. under a pressure of 50 p.s.i. The rates were adjusted so that the proportion of the tetraethyl lead to the ethylene was approximately 1 part by weight per 100 parts by weight of ethylene. The contact time in the polymerization zone was maintained at 1 hour, and the resulting mixture was progressively withdrawn at a rate equivalent to the rate of introduction of the various components. Under these conditions, substantially complete conversion of the ethylene to high molecular weight, highly crystalline polyethylene resulted.

Example 6

100 ml. of dry toluene was added to a 500 cc. pressure bottle and with the system under nitrogen, a mixture of 1 g. of tetraethyl lead, 1 g. of aluminum trichloride and 1 g. of titanium tetrachloride was added. This reaction mixture was attached to a source of ethylene and agitated under 30 p.s.i. ethylene pressure for 2 hours at room temperature and then for 2 hours at 90° C. A 12 g. yield of solid polyethylene having a molecular weight of approximately 25,000 was obtained.

Example 7

A mixture of 100 g. of heptane, 1 g. of tetraethyl tin, 5 g. of aluminum trichloride and 1 g. of titanium tetrachloride was agitated under 30 p.s.i. ethylene pressure for 2 hours at 30° C. and 2 hours at 90° C. A 6 g. yield of high molecular weight solid polyethylene resulted therefrom.

Example 8

A mixture of 1 g. of tetraethly tin, 1 g. of aluminum trichloride and 1 g. of titanium tetrabromide in 100 ml. of heptane was agitated under 30 p.s.i. ethylene pressure for 2 hours at 30° C. and 2 hours at 90° C. A good yield of solid polyethylene resulted having characteristics as described in Example 1.

Example 9

A mixture of 1 g. of tetraethyl tin, 1 g. of aluminum trichloride and 1 g. of titanium tetrabutoxide in 100 ml. of heptane was agitated under 30 p.s.i. ethylene pressure at 30° C. for 2 hours and at 90° C. for 2 hours. A 10 g. yield of high molecular weight solid polyethylene was obtained.

Example 10

A solution of 1 g. of tetraethyl tin, 1 g. of aluminum trichloride and 1 g. of titanium tetrachloride in 100 ml. of toluene was agitated under 30 p.s.i. ethylene pressure for 2 hours at room temperature and at 90° C. for 2 hours under an ethylene pressure of 30 to 50 p.s.i. A good yield of high molecular weight solid polyethylene was obtained.

Example 11

The procedure of Example 1 was followed using magnesium chloride in place of the aluminum chloride. After effecting the process according to the conditions described, polyethylene having the characteristics set out was obtained in slightly lower yield than shown in Example 1. Similar results were obtained when using zinc chloride in place of the aluminum chloride. Similar results were also obtained with propylene as the monomer as well as with mixtures of ethylene and propylene. Other α-monoolefins also polymerized in similar fashion including such materials as 1-pentene, 1-hexene and 1-decene.

The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

I claim:

1. In the polymerization of α-monoolefinic hydrocarbon material from the group consisting of ethylene and propylene to form solid polymer, the improvement which comprises catalyzing the polymerization at a temperature from −60° C. to 130° C. with a catalytic mixture of a halide of a metal from the group consisting of aluminum trihalide, zinc dihalide and magnesium halide, a compound of the formula $M(R)_4$ wherein M is a member of the group consisting of lead and tin and R is an alkyl group of 1–12 carbon atoms, and a titanium compound from the group consisting of titanium tetrachloride, titanium tetrabromide, and titanium tetraalkoxides wherein each alkoxide group contains 1–4 carbon atoms, the mole ratios of the components of said mixture to each other being in the range of from 1:4 to 4:1.

2. In the polymerization of at least one monoolefin from the group consisting of ethylene and propylene to form solid polymer, the improvement which comprises effecting the polymerization in dispersion in an inert organic liquid at a temperature of from −60° C. to 130° C. and in the presence of a catalytic mixture of aluminum trihalide, tetraalkyl lead wherein each alkyl group contains 1–12 carbon atoms, and titanium tetrachloride, the mole ratios of the components of said mixture to each other being in the range of from 1:4 to 4:1.

3. In the polymerization of at least one monoolefin from the group consisting of ethylene and propylene to form solid polymer, the improvement which comprises effecting the polymerization in dispersion in an inert organic liquid at a temperature of from −60° C. to 130° C. and in the presence of a catalytic mixture of aluminum trihalide, tetraalkyl lead wherein each alkyl group contains 1–12 carbon atoms, and titanium tetrabromide, the mole ratios of the components of said mixture to each other being in the range of from 1:4 to 4:1.

4. In the polymerization of at least one monoolefin from the group consisting of ethylene and propylene to form solid polymer, the improvement which comprises effecting the polymerization in dispersion in an inert organic liquid at a temperature of from −60° C to 130° C. and in the presence of a catalytic mixture of aluminum trihalide, tetraalkyl lead wherein each alkyl group contains 1–12 carbon atoms, and titanium tetraalkoxide wherein each alkoxide group contains 1–4 carbon atoms, the mole ratios of the components of said mixture to each other being in the range of from 1:4 to 4:1.

5. In the polymerization of at least one monoolefin from the group consisting of ethylene and propylene to form solid polymer, the improvement which comprises effecting the polymerization in dispersion in an inert organic liquid at a temperature of from −60° C. to 130° C. and in the presence of a catalytic mixture of aluminum trihalide, tetraalkyl tin wherein each alkyl group contains 1–12 carbon atoms and titanium tetrachloride, the mole ratios of the components of said mixture to each other being in the range of from 1:4 to 4:1.

6. In the polymerization of at least one monoolefin from the group consisting of ethylene and propylene to form solid polymer, the improvement which comprises effecting the polymerization in dispersion in an inert organic liquid at a temperature of from −60° C. to 130° C. and in the presence of a catalytic mixture of aluminum trihalide, tetraalkyl tin wherein each alkyl group contains 1–12 carbon atoms and titanium tetraalkoxide wherein each alkoxide group contains 1–4 carbon atoms, the mole ratios of the components of said mixture to each other being in the range of from 1:4 to 4:1.

7. In the polymerization of at least one monoolefin from the group consisting of ethylene and propylene to form solid polymer, the improvement which comprises effecting the polymerization in dispersion in an inert liquid hydrocarbon at a temperature from −20° C. to 80° C. and in the presence of a catalytic mixture of substantially equimolar proportions of aluminum trichloride, tetraethyl lead, and titanium tetrachloride.

8. In the polymerization of at least one monoolefin from the group consisting of ethylene and propylene to form solid polymer, the improvement which comprises effecting the polymerization in dispersion in an inert liquid hydrocarbon at a temperature of from −20° C. to 80° C. and in the presence of a catalytic mixture of substantially equimolar proportions of aluminum trichloride, tetraethyl tin, and titanium tetrachloride.

9. In the polymerization of at least one monoolefin from the group consisting of ethylene and propylene to from solid polymer, the improvement which comprises effecting the polymerization in dispersion in an inert liquid hydrocarbon at a temperature of from −20° C. to 80° C. and in the presence of a catalytic mixture of substantially equimolar proportions of aluminum trichloride, tetraethyl lead and titanium tetrabromide.

10. In the polymerization of at least one monoolefin from the group consisting of ethylene and propylene to form solid polymer, the improvement which comprises effecting the polymerization in dispersion in an inert liquid hydrocarbon at a temperature of from −20° C. to 80° C. and in the presence of a catalytic mixture of substantially equimolar proportions of aluminum trichloride, tetraethyl lead and titanium tetrabutoxide.

11. In the polymerization of at least one monoolefin from the group consisting of ethylene and propylene, the improvement which comprises effecting the polymerization in dispersion in an inert liquid hydrocarbon at a temperature of from −20° C. to 80° C. and in the presence of a catalytic mixture of substantially equimolar proportions of aluminum trichloride, tetraethyl tin and titanium tetrabutoxide.

12. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of 1–4 molar proportions respectively of a halide of a metal from the group consisting of aluminum trihalide, zinc dihalide and magnesium halide, a compound of the formula M(R)$_4$ wherein M is a member of the group consisting of lead and tin and R is an alkyl group of 1–12 carbon atoms, and a titanium compound from the group consisting of titanium tetrachloride, titanium tetrabromide and titanium tetraalkoxides wherein each alkoxide group contains 1–4 carbon atoms, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

13. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of aluminum trihalide, tetraalkyl lead wherein each alkyl group contains 1–12 carbon atoms and titanium tetrachloride, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process, the mole ratios of the components of said mixture to each other being in the range of from 1:4 to 4:1.

14. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of aluminum trihalide, tetraalkyl tin wherein each alkyl group contains 1–12 carbon atoms and titanium tetrachloride, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process, the mole ratios of the components of said mixture to each other being in the range of from 1:4 to 4:1.

15. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of aluminum trihalide, tetraalkyl lead wherein each alkyl group contains 1–12 carbon atoms, and titanium tetraalkoxide wherein each alkoxide group contains 1–4 carbon atoms, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process, the mole ratios of the components of said mixture to each other being in the range of from 1:4 to 4:1.

16. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum trichloride, tetraethyl lead and titanium tetrachloride, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

17. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum trichloride, tetraethyl tin and titanium tetrachloride, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

18. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum trichloride, tetraethyl lead, and titanium tetrabromide, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

19. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum trichloride, tetraethyl tin and titanium tetrabutoxide, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from said zone at a substantially constant rate equivalent to the rate of introduction of said polymerization mixture whereby the relative proportions of the various components in said zone remain substantially unchanged during said process.

20. The process for the polymerization of ethylene to form solid polymer which comprises polymerizing ethylene in the presence of a catalyst mixture of a metal tetraalkyl wherein the metal is selected from the group consisting of tin and lead and the alkyl group contains not more than four carbon atoms, titanium tetrachloride and aluminum chloride.

References Cited in the file of this patent

UNITED STATES PATENTS

| | | |
|---|---|---|
| 2,117,022 | Cramer | May 10, 1938 |
| 2,440,498 | Young et al. | Apr. 27, 1948 |
| 2,721,189 | Anderson et al. | Oct. 18, 1955 |
| 2,786,035 | Freimiller et al. | Mar. 19, 1957 |

FOREIGN PATENTS

| | | |
|---|---|---|
| 533,362 | Belgium | May 16, 1955 |

Notice of Adverse Decision in Interference

In Interference No. 93,867 involving Patent No. 3,072,631, F. B. Joyner, POLYMERIZATION OF α-OLEFINS WITH THREE COMPONENT SOLUBLE CATALYSTS IN LIQUID PHASE, final judgment adverse to the patentee was rendered June 25, 1965, as to claims 2, 3, 5, 7, 9, 13, 14, 16, 17, 18 and 20.

[*Official Gazette September 28, 1965.*]